United States Patent Office.

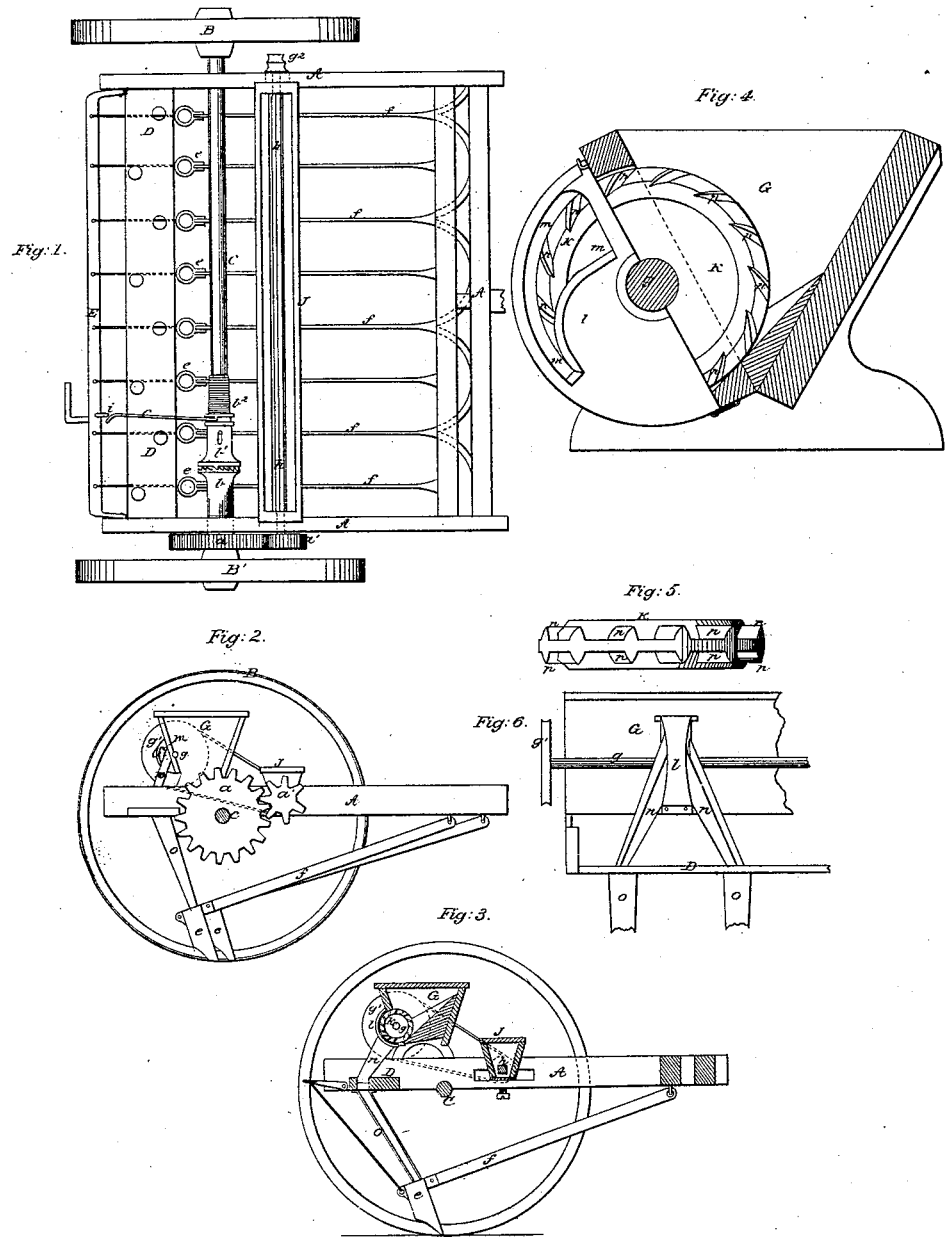

D. C. BAUGHMAN, OF FORT SENECA, OHIO.

Letters Patent No. 60,846, dated January 1, 1867

IMPROVEMENT IN SEEDING-MACHINE.

*The Schedule referred to in these Letters Patent and making part of the same.*

TO ALL WHOM IT MAY CONCERN:

Be it known that I, D. C. BAUGHMAN, of Fort Seneca, in the county of Seneca, and State of Ohio, have invented a new and improved Seeding-Machine; and I do hereby declare that the following is a full, clear, and exact description thereof, reference being had to the accompanying drawings, making a part of this specification, in which—

Figure 1 is a plan view of the seeding-machine with the rear or main hopper detached.

Figure 2 is an elevation of one side of the machine with one of the transporting-wheels removed.

Figure 3 is a longitudinal section taken in a vertical plane through the machine.

Figure 4 is an enlarged sectional view of the main hopper, showing the arrangement and construction of one of the seed-dropping wheels.

Figure 5 is an edge view of one of the dropping-wheels.

Figure 6 shows the application of two conveyors to one of the seed droppers.

Similar letters of reference indicate corresponding parts in the several figures.

The object of one part of my invention is to sow seed in drills and broadcast at the same time, and to so construct a machine for this purpose that the seed-dropping devices can all be thrown out of or into operation at pleasure while the machine is moving along. Another object of my invention is to provide for regulating the dropping of the seed from the hoppers of a machine which is adapted for sowing in drills and broadcast at the same time, as will be hereinafter described.

To enable others skilled in the art to understand my invention, I will describe its construction and operation.

A represents the frame of the machine, which is mounted upon two transporting-wheels, B B′, which are both keyed to a turning axle, C. On one side (outside) of the frame A a large spur-wheel, $a$, is applied loosely upon the axle C, the hub, $b$, of which wheel projects inside of the frame A, and has teeth formed on its inner end for receiving spurs which project from the end of a sliding tube $b^1$. This tube $b^1$ turns with the axle C, but it is allowed to have an endwise movement in order that it may be engaged or disengaged with the hub of the spur-wheel $a$. A spring, $b^2$, shown in fig. 1, is used for keeping the tube $b^1$ in contact with the tube $b$, when the former tube is not acted upon by a yoked lever, $c$. This lever $c$ is pivoted to the transverse tube-board D, which is arranged in rear of the axle C, and the rear end of this lever is curved in such manner that when the supporting bar E is elevated, a projection, $i$, on this bar will strike the lever $c$ and move the tube $b^1$ away from the hub $b$, thus disengaging the wheel $a$ from the axle C, so that this axle will turn without turning said wheel. When the bar E is moved backward the lever $c$ will be released and the spring $b^2$ will force the tube $b^1$ into gear with the hub $b$, thus engaging the wheel $a$ with its axle C again. The bar E has its extremities bent at right angles to it and pivoted to the rear ends of the longitudinal beams of the frame A, and to this bar all the drill-teeth, $e$ $e$, are attached by means of chains, so that when the bar is elevated the teeth, which are secured to swinging drag-bars, $f$ $f$, will also be elevated. The main hopper, G, is secured to the longitudinal beams of the frame A in front of the tube-board D, and along the back side of this hopper is a shaft, $g$, to which the seed-discharging wheels, $k$ $k$, are all attached, as will be hereinafter described. On one end of the shaft $g$ a belt-wheel, $g^1$, is keyed, over which passes a belt that is stretched over a cone pulley, $g^2$, on a transverse shaft, $h$. This shaft $h$ passes through a small hopper, J, which extends transversely across the frame A, and which is so applied to this frame that the end nearest the cone-pulley $g^2$ can be adjusted backward and forward and set at any desired point for admitting of the use of shorter or longer belts on the cone-pulley $g^2$. On the opposite end of the shaft $h$, to the pulley $g^2$, a pinion spur-wheel, $a'$, is keyed, which engages with the large wheel $a$ on the shaft C, and is turned with this wheel $a$. It will thus be seen that the shaft $g$ at the back of the hopper G receives its motion from the axle C through the medium of the spur-wheels $a$ $a'$, shaft $h$, and pulleys $g^1 g^2$. By this arrangement the dropping of the seed will cease when the bar E is raised sufficiently high to lift the drill-teeth from the ground. The broadcast distributing-hopper, J, has a thin plate in its bottom with diagonal openings through it for the escape of the seed; and that portion of the shaft $h$ which passes through this hopper is square for the purpose of agitating and effecting a regular discharge of the seed from this hopper. The shaft $g$ has a number of discharging-wheels, $k$, keyed on it at regular intervals apart; one half of each one of these wheels projects within the hopper among the seed, and the other half projects outside of the hopper and is covered by a semi-cylindrical seed-guard, $l$, as shown in fig. 4. Each discharging-wheel, $k$, has a cap or guard $l$, and each guard has an opening, m, in each side, through which the seed are discharged into spouts n n, which spouts conduct the seed to the tubes, o, that are attached to the board D. The openings m m in the sides of the guards are made quite small at their lower termini, and gradually increase in size or area as they rise to their upper termini, and the edges of these openings are bevelled so as to allow all the seed to escape freely. The object of making said openings through the seed-guards of the form represented in fig. 4 is to cause a regular flow of the seed from the seed-cups on the wheels k and to prevent any of the seed from being carried back into the hopper again. If desirable, each one of the seed-guards may be so applied to the back of the hopper that they can be removed at pleasure. The bottom of the hopper has a greater incline than its front side, as shown in figs. 3 and 4, and this inclined bottom has recesses formed in it for receiving the wheels k. The circumference of each wheel k is bevelled on each side, as shown in figs. 4 and 5, and these bevelled surfaces terminate in a central annular flange, which is very narrow. On each side of this central flange are triangular fins, p p, which are arranged in pairs around the wheel so as to form cups on the sides of this wheel and scrapers or conveyors for gathering the seed from the hopper and conveying it to the discharge openings m m. By thus constructing the discharging-wheels they serve as agitators for preventing the seed from clogging in the hopper, and also carry out of the hopper double quantities of seed; hence I am enabled to employ two conveyors for each discharging-wheel, and to make these wheels sufficiently large to supply two conveyors without liability of clogging.

Having thus described my invention, what I claim as new, and desire to secure by Letters Patent, is—

1. The combination of the two hoppers G and J with the shafts $g$ $h$, spur-wheels $a$ $a'$, pulleys $g^1$ $g^2$, or their equivalent, and clutch $b$ $b^1$, upon the axle C, and lever $c$, which is acted upon by the bar E, to which the drill-teeth are attached, all operating substantially as described.

2. Adapting the shaft $h$ of the hopper J to serve as an agitator for this hopper, and also as a means for transmitting motion from the axle C to the shaft $g$ of the hopper G, substantially as described.

3. The construction of seed-guards $l$, with openings $m$ in their sides, in combination with rotary seed-dischargers, substantially as described.

4. Making the openings through the sides of the seed-guards $l$ larger at their upper ends than at their lower ends, substantially as described.

5. Constructing the rotary seed-dischargers $k$ with discharging wings on each side, substantially as described.

D. C. BAUGHMAN.

Witnesses:
 MARTIN NIGHSUANDER,
 DAVID J. GOODELL.